(12) United States Patent
Januszewski et al.

(10) Patent No.: US 9,778,889 B2
(45) Date of Patent: Oct. 3, 2017

(54) MANAGING PRINT JOBS BASED ON PLANNED ROUTES

(71) Applicant: Konica Minolta Laboratory U.S.A., Inc., San Mateo, CA (US)

(72) Inventors: Michael Januszewski, Lafayette, CO (US); Isao Hayami, Burlingame, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 14/928,708

(22) Filed: Oct. 30, 2015

(65) Prior Publication Data
US 2017/0123737 A1  May 4, 2017

(51) Int. Cl.
*G06F 3/12* (2006.01)

(52) U.S. Cl.
CPC ............ *G06F 3/126* (2013.01); *G06F 3/1207* (2013.01); *G06F 3/1292* (2013.01); *H04N 2201/0082* (2013.01)

(58) Field of Classification Search
CPC combination set(s) only.
See application file for complete search history.

(56) References Cited

U.S. PATENT DOCUMENTS

| | | | |
|---|---|---|---|
| 2010/0309510 A1 | 12/2010 | Hansen | |
| 2012/0069386 A1* | 3/2012 | St. Laurent | G06F 3/1204 358/1.15 |
| 2013/0107312 A1* | 5/2013 | Venkatesh | G06F 3/1207 358/1.15 |
| 2014/0365107 A1* | 12/2014 | Dutta | G01C 21/343 701/408 |
| 2015/0019125 A1* | 1/2015 | Mazanec | G01C 21/3682 701/410 |

FOREIGN PATENT DOCUMENTS

JP  5617469 B2  11/2014

* cited by examiner

*Primary Examiner* — Henok A Shiferaw
(74) *Attorney, Agent, or Firm* — Osha Liang LLP (57) ABSTRACT

A method performed by a print service provider (PSP) for printing, including: (a) obtaining from a network a print job issued by a mobile device and specifying a printer feature; (b) obtaining a first location on a planned route of a user of the mobile device; (c) determining a first printer having the printer feature and located within a predetermined distance of the first location; (d) sending a notification identifying the first printer to the mobile device; (e) determining if a deviation from the planned route exists; (f) if the deviation exists, repeating the steps (b) through (e) for a revised route; and (g) if the deviation does not exist: receiving a confirmation for the first printer; and sending the print job to the first printer in response to the confirmation. The first printer generates a hardcopy document from the print job using the printer feature.

17 Claims, 4 Drawing Sheets

MANAGING PRINT JOBS BASED ON PLANNED ROUTES

BACKGROUND

Mobile devices including smart phones and tablet personal computers (PCs) are ubiquitous. Users of these mobile devices frequently wish to print (i.e., generate a hardcopy) various types of electronic documents (EDs). However, as the mobile devices are generally not physically connected to a printer and are often used in public spaces, it can be difficult for the users to actually find a printer and print the EDs.

Further, mobile device users are frequently in transit to various destinations. A user may wish to print an ED at his destination, or at some location along his planned route before the destination is reached. However, the mobile device user is unaware as to the location of public printers, especially public printers having the desired or necessary features (e.g., color printing, duplex printing, three-hole punching, specific fonts, etc.) to correctly generate a hardcopy of the ED. Regardless, many mobile device users still wish to print EDs from their mobile devices while in transit.

SUMMARY

In general, in one aspect, the invention relates to a method performed by a print service provider (PSP) for printing. The method comprises: (a) obtaining from a network a print job issued by a mobile device and specifying a printer feature; (b) obtaining a first location on a planned route of a user of the mobile device; (c) determining a first printer comprising the printer feature and located within a predetermined distance of the first location; (d) sending a notification identifying the first printer to the mobile device; (e) determining if a deviation from the planned route exists; (f) if the deviation exists, repeating the steps (b) through (e) for a revised route; and (g) if the deviation does not exist: receiving a confirmation for the first printer; and sending the print job to the first printer in response to the confirmation, wherein the first printer generates a hardcopy document from the print job using the printer feature.

In general, in one aspect, the invention relates to a non-transitory computer readable medium (CRM) storing computer readable program code. The computer readable program code causes a print service provider (PSP) to: (a) obtain from a network a print job issued by a mobile device and specifying a printer feature; (b) obtain a first location on a planned route of a user of the mobile device; (c) determine a first printer comprising the printer feature and located within a predetermined distance of the first location; (d) send a notification identifying the first printer to the mobile device; (e) determine if a deviation from the planned route exists; (f) if the deviation exists, repeating the steps (b) through (e) for a revised route; and (g) if the deviation does not exist: receive a confirmation for the first printer; and send the print job to the first printer in response to the confirmation, wherein the first printer generates a hardcopy document from the print job using the printer feature.

In general, in one aspect, the invention relates to a system for printing. The system comprises: a buffer that stores a print job issued by a mobile device and specifying a printer feature, wherein the mobile device is operated by a user; a geographic routing engine that: (a) obtains a first location on a planned route of the user; and (b) determines if a deviation from the planned route exists; a matching engine that: (c) determines a first printer located within a predetermined distance of the first location; and a messaging engine that: (d) sends a notification identifying the first printer to the user mobile device, wherein the steps (a), (c), and (d) are repeated for a revised route if the deviation exists; (e) receives a confirmation for the first printer from the mobile device if the deviation does not exist; and (f) sends the print job to the first printer in response to the confirmation, wherein the first printer generates a hardcopy from the print job using the printer feature.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for printing. Specifically, a print job issued by a mobile device and specifying a printer feature is received by a print service provider. The print service provider then obtains one or more locations on the planned route of the user of the mobile device. One of the locations may be a destination of the user. The print service also determines one or more printers near the location(s) that have the printer feature and/or are available to generate the hardcopy document within a specified time constraint. The printers may be at fixed and known locations. If the user deviates from the route, the process may be repeated for a revised route. The user of the mobile device is able to select a printer, and the print job is subsequently sent to the selected printer to generate a hardcopy.

In one or more embodiments, the printer feature is any attribute, function, or capability of the printer that is necessary or requested to generate a hardcopy document from the print job. Example printer features include one or more of color printing, duplex printing, three-hole punching, paper sizes, specific fonts supported by the printer, specific software or versions of software executing on the printer, economy modes, low-power modes, high-speed printing, etc.

Figure 1:
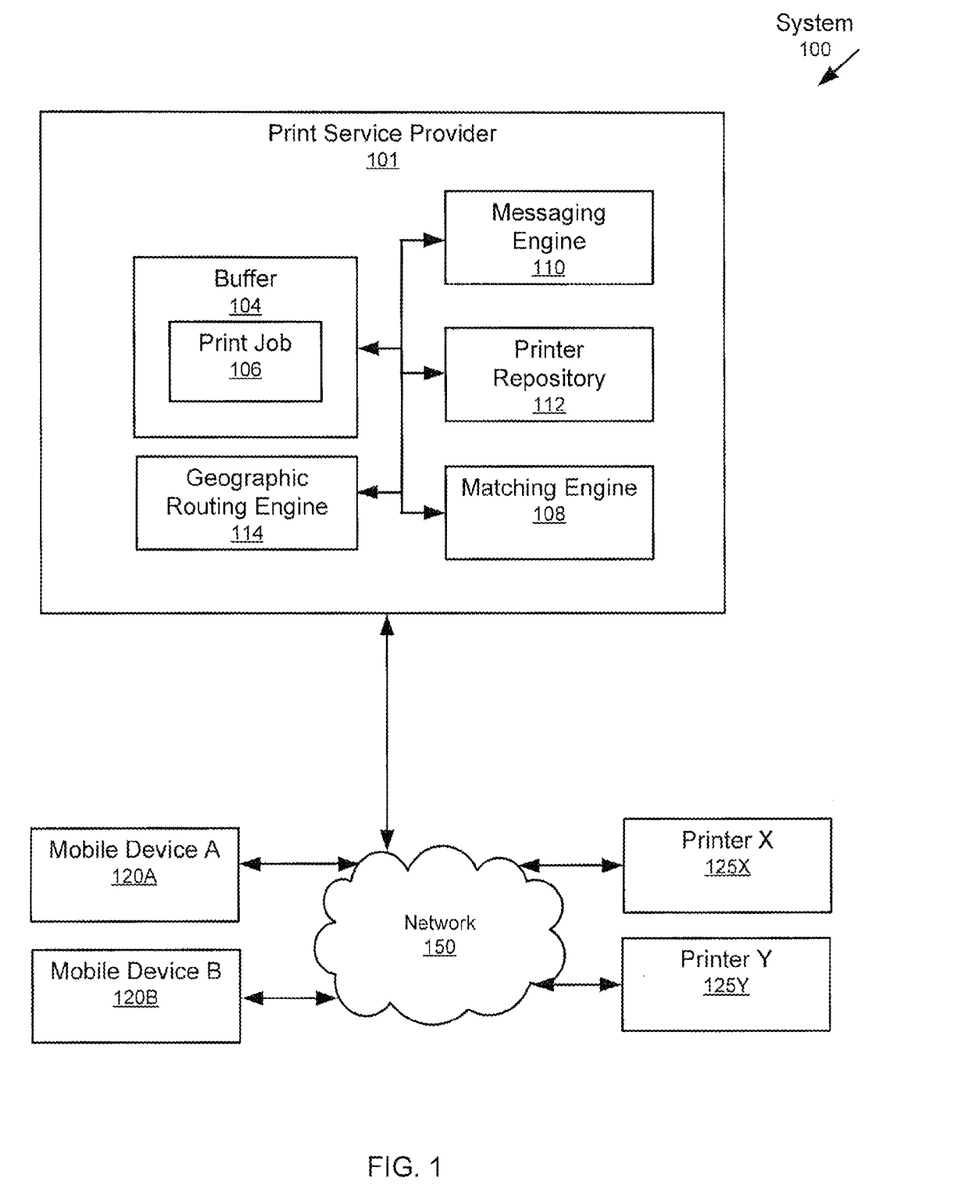
FIG. 1 shows a system in accordance with one or more embodiments of the invention.

FIG. 1 shows a system (100) in accordance with one or more embodiments of the invention. As shown in FIG. 1, the system (100) has multiple components including, for example, a print service provider (101), one or more mobile devices (i.e., Mobile Device A (120A), Mobile Device B (120B)), and one or more printers (i.e., Printer X (125X), Printer Y (125Y)). Each of these components (101, 120A, 120B, 125X, 125Y) may be connected by a network (150) of any size having wired and/or wireless segments. Each of these components is discussed below.

In one or more embodiments of the invention, the system (100) includes multiple printers (125X, 125Y). Although FIG. 1 only shows two printers, there may be any number of printers. Each printer may have different printer features. For example, one or more printers may be capable of color printing. As another example, one or more printers may be capable of duplex printing. As another example, one or more printers may be loaded with various paper sizes. As another example, one or more printers may be capable of punching holes in printed pages and/or stapling printed pages. As yet another example, special fonts or software (e.g., rendering engines) may be installed on one or more printers.

In one or more embodiments of the invention, the printers (125X, 125Y) are fixed and have known locations. In other words, the printers (125X, 125Y) are stationary and the locations (e.g., GPS coordinates) of the printers (125X, 125Y) are known. At any given time, one or more printers may be occupied and unable to print. Similarly, at any given time, one or more printers may be unoccupied and ready to print. One or more of the printers (125X, 125Y) may be public printers and available to anyone for free or for a fee. One or more of the printers (125X, 125Y) may only be available to users who have existing accounts and may require users to input an authentication credential (e.g., password, personal identification number (PIN), biometrics, etc.) before a hardcopy is generated.

In one or more embodiments of the invention, the system (100) includes one or more mobile devices (120A, 120B). Each mobile device (120A, 120B) may correspond to a smart phone, a personal digital assistant (PDA), a tablet PC, a laptop computer, etc. Each mobile device is operated by a user. Although only two mobile devices (120A, 120B) are shown in FIG. 1, the system (100) may have any number of mobile devices.

In one or more embodiments of the invention, each mobile device (120A, 120B) generates and issues print jobs. Each print job may include the content (e.g., word processing document, slide, spreadsheet, webpage, image, photograph, etc.) to be printed and specify one or more printer features needed to correctly print the content. As discussed above, example printer features include color printing, duplex printing, hole-punching, etc. The printer features may be specified within the print job and/or within the content to be printed (e.g., as attributes within tags). Further, the user may specify printer features (e.g., high speed printing, low-power consumption printing, a time constraint for printing (e.g., within the next 2 mins), etc.) to be included in the print job. The print job may also include an authentication credential (e.g., PIN, password, biometric, etc.) of the user, an identification (e.g., user name) of the user or the mobile device (e.g., cell number, serial number, etc.), a print job number, etc.

In one or more embodiments of the invention, each mobile device (120A, 120B) includes a GPS receiver. In other words, each mobile device may periodically, or at random intervals, be updated with its GPS coordinates. The mobile device may include these GPS coordinates in print jobs. Additionally or alternatively, these GPS coordinates may be sent separately from the print jobs (discussed below). Like the print job, the updated GPS coordinates may be sent with an authentication credential of the user, an identification of the user or mobile device, a print job number, etc.

In one or more embodiments of the invention, each mobile device (120A, 120B) executes a calendar application. The calendar application enables a user of the mobile device to create and revise a schedule with hourly, daily, weekly, monthly, etc. appointments and events. The schedule may specify the destinations (i.e., venue names, addresses, etc.) of the appointments and the events. The schedule may also specify the times/dates associated with each destination. The multiple destinations effectively define a planned route for the user. Each destination may be considered a location on the user's planned route. The mobile device may include the schedule in issued print jobs. Additionally or alternatively, the schedule or revised schedules may be sent separately from the print job. Like the print job, the revised schedule may be sent with an authentication credential of the user, an identification of the user or mobile device, a print job number, etc.

In one or more embodiments of the invention, each mobile device (120A, 120B) executes a navigation application. The navigation application includes functionality to plot a route (e.g., transit directions) for a user in response to the user specifying multiple points (e.g., names of businesses, addresses, GPS coordinates, etc.). The route may be revised in response to a user request or the user failing to follow the initially plotted route. The mobile device may include the plotted route in print jobs. Additionally or alternatively, the plotted route or revised plotted routes may be sent separately from the print job. Like the print job, the revised plotted route may be sent with an authentication credential of the user, an identification of the user or mobile device, a print job number, etc. The plotted route may be referred to as a planned route.

In one or more embodiments of the invention, each mobile device (120A, 120B) may receive notifications identifying one or more printers and send confirmations for one of the identified printers (discussed below). The mobile device (120A, 120B) displays the notification to the user and allows the user to select (e.g., via a GUI widget, a webpage with a URL link, etc.) one of the identified printers for the confirmation. The notifications and/or confirmations may be exchanged using email, text messaging, social network messaging, etc. The notifications and/or confirmations may be exchanged via the network (150).

Those skilled in the art, having the benefit of this detailed description, will appreciate that while the printers (125X, 125Y) are usually fixed, the mobile devices (120A, 120B) are not. Accordingly, over time, the distance between a mobile device and each of the printers (125X, 125Y) may change. Moreover, one or more of the printers (125X, 125Y) may be located along a planned route of the user or at a destination of the user.

In one or more embodiments of the invention, the system (100) includes the print service provider (101). As shown in FIG. 1, the print service provider (101) has multiple components including a buffer (104), a geographical routing engine (114), a matching engine (108), a printer repository (112), and a messaging engine (110). Each of these components (104, 108, 110, 112, 114) may be located on the same computing device (e.g., server, mainframe, personal computer, mobile computer, etc.) or may be located on different computing devices connected by a network (e.g., network (150) or another network (not shown)). The network (150) may be the Internet.

In one or more embodiments of the invention, the print service provider (101) includes the buffer (104). The buffer (104) may be implemented in hardware (i.e., circuitry), software, or any combination thereof. The buffer (104) is configured to store and queue print jobs (e.g., print job (106)) received over the network (150) from the mobile devices (120A, 120B). As discussed above, the print job (106) may specify one or more printer features. The print job (106) may also include one or more of: the location (e.g., GPS coordinates) of the mobile device that issued the print job (106), a schedule of the mobile device user, and a plotted route of the user, etc. The buffer (104) may also store any updated locations (e.g., updated GPS coordinates), revised schedules, and/or revised plotted routes sent by one or more mobile devices (120A, 120B).

In one or more embodiments of the invention, the print service provider (101) includes a printer repository (112). The printer repository (112) may be implemented in hardware (i.e., circuitry), software, or any combination thereof. The printer repository (112) stores the locations (e.g., GPS coordinates) of the multiple printers (125X, 125Y) and the printer features of each printer (125X, 125Y). The printer repository (112) may be an array, a linked-list, a lookup table, or any other type of data structure.

In one or more embodiments of the invention, the print service provider (101) includes the geographic routing engine (114). The geographic routing engine (114) may be implemented in hardware (i.e., circuitry), software, or any combination thereof. In one or more embodiments, the geographic routing engine (114) is configured to obtain one or more locations on a planned route of a mobile device user. The geographic routing engine (114) may obtain the coordinates (e.g., GPS coordinates) for these locations by querying external databases and/or websites.

For example, if a print job is associated with the schedule of a user, one location may be a destination of the user specified in the schedule. The geographic routing engine (114) obtains the destination by parsing the schedule. As another example, if a print job is associated with a plotted route generated by navigation software (e.g., transit directions), the one or more locations may be buildings, stores, intersections, landmarks, etc. that are passed or encountered in the plotted route. These destinations may be labeled in the plotted route. The geographic routing engine (114) obtains the locations by extracting the labels. The plotted route may already include the coordinates (e.g., GPS coordinates) of the locations.

In one or more embodiments of the invention, a mobile device user specifies one or more locations along the planned route by specifying one or more distances from the start or destination of the planned route. Each distance may be specified in the print job and extracted from the print job by the geographical routing engine (114). The coordinates of the locations may be calculated based on the coordinates of the start or destination of the planned route and the specified distances.

In one or more embodiments of the invention, the geographic routing engine (114) is configured to determine if there is a deviation from the planned route. For example, if a revised schedule or a revised plotted route is received from the user mobile device, this may indicate that the user has deviated from the planned route. New locations may be obtained from the revised route.

As another example, if there is a mismatch (e.g., significant distance) between the destination and the mobile device's coordinates (e.g., GPS coordinates) at a time specified in the schedule when the user is expected to be at the destination, this may indicate the user has deviated from the planned route. As yet another example, if the current coordinates (e.g., GPS coordinates) of the user mobile device are not on (or not near) the plotted route, this may indicate that the user has deviated from the planned route.

In one or more embodiments, if no revised schedule or revised plotted route is received from the user mobile device, the geographic routing engine (114) generates a revised route by adding the current location of the user to the existing planned route. New locations may be obtained from the revised route. Additionally or alternatively, the revised route may consist solely of the current location (e.g., GPS coordinates) of the user.

In one or more embodiments of the invention, the print service provider (101) includes the matching engine (108). The matching engine (108) may be implemented in hardware (i.e., circuitry), software, or any combination thereof. The matching engine (108) is configured to identify one or more printers (125X, 125Y) to process (i.e., generate a hardcopy document) the print job (106). Accordingly, the matching engine (108) may search the printer repository (112) for printers that have the printer features specified in the print job (106).

In one or more embodiments of the invention, the matching engine (108) calculates the distance (e.g., using the GPS coordinates) between each printer having the printer features specified in the print job (106) and the one or more locations on the planned route. The location of each printer may be retrieved from the printer repository (112). In one or more embodiments of the invention, only printers within a predetermined distance of the locations on the planned route are deemed eligible to process the print job (106). There may be different predetermined distances for different locations.

In one or more embodiments of the invention, the print service provider (101) includes the messaging engine (110). The messaging engine (110) is configured to send notifications to mobile devices (120A, 120B) that have issued print jobs. Each notification may identify one or more printers that have the printer features specified in the print job and that are within a predetermined distance of location(s) obtained from the planned route. The notification may be in the format of a text message, an email, a fax, a webpage with URL links, a GUI, an audio recording, a social network message, etc. The notification is accessible by the mobile device that issued the print job.

In one or more embodiments of the invention, the messaging engine (110) is configured to obtain confirmations from the mobile device (120A, 120B). A confirmation is effectively a response to a notification. Specifically, a confirmation may be a selection of one printer identified in the notification (if multiple printers are identified in the notification) and/or an approval to send the print job to the printer. The selection and approval are made by the user of the mobile device (120A, 120B). The selection may be made by manipulating a GUI widget, entering a number or code in a text message or email, a voice command, clicking a URL link, etc. In one or more embodiments of the invention, the messaging engine (110) sends the print job to the approved printer (125X, 125Y). Like the notification, the confirmation may take any format (e.g., email, fax, URL selection, etc.).

Although the system (100) in FIG. 1 is shown as having only one print service provider (101), there may be multiple print service providers each having similar components and each connected to all or a subset of the printers. Further, the system (100) may have additional components that are not shown.

Figure 2:
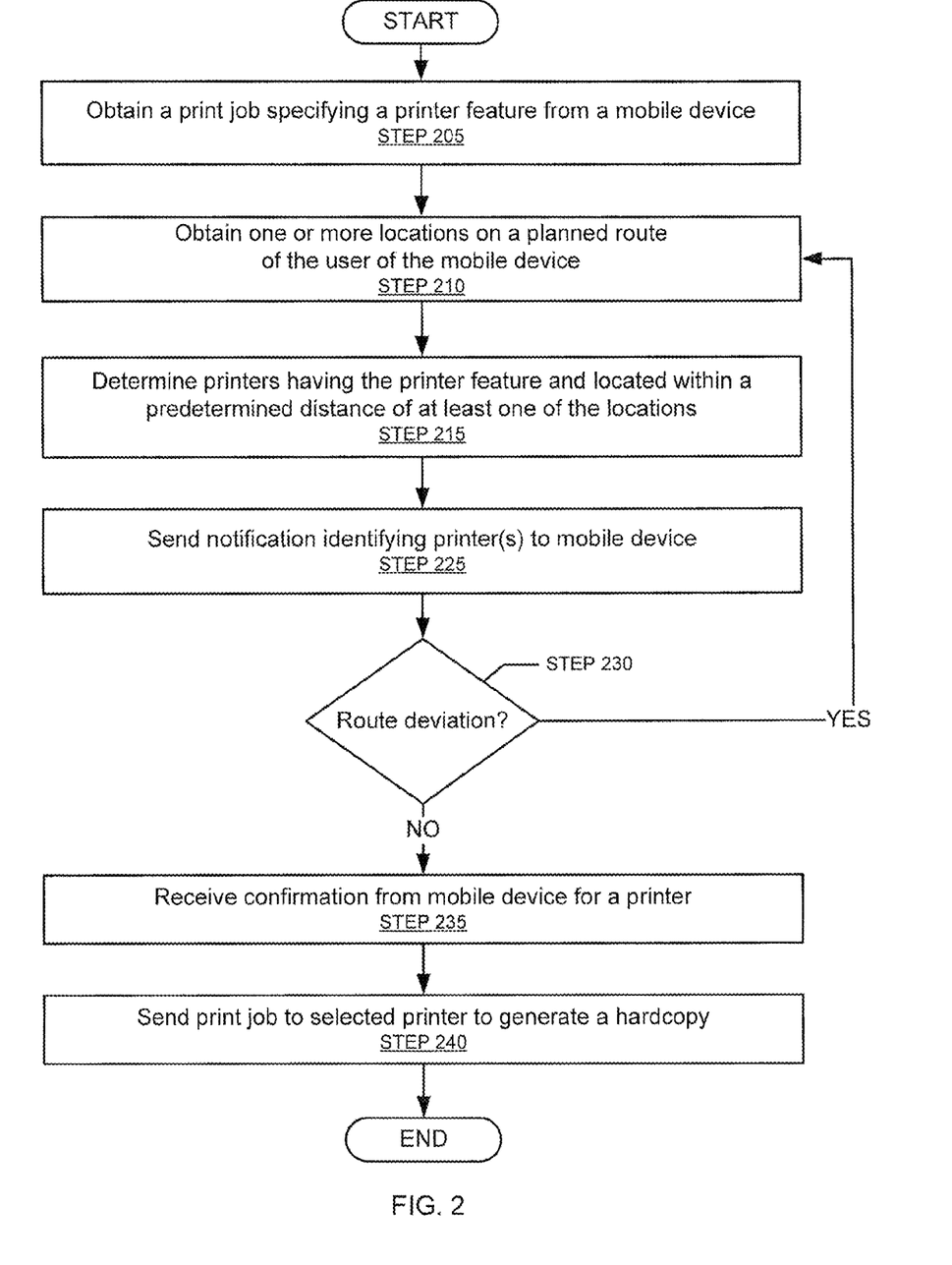
FIG. 2 shows a flowchart in accordance with one or more embodiments of the invention.

FIG. 2 shows a flowchart in accordance with one or more embodiments of the invention. The flowchart depicts a process for printing. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, a print job is obtained (STEP 205). The print job may be issued by a mobile device and obtained by a print service provider over a network. The print job may specify the content to be printed and one or more printer features, such as those mentioned above. One or more printer features may be specified within the print job and/or within the content to be printed (e.g., as attributes within tags). Further, one or more print features in the print job may be specified by a user/operator of the mobile device (e.g., high speed printing, low-power consumption printing, a time constraint for printing (e.g., within the next 2 minutes), etc.). The print job may also include an authentication credential (e.g., PIN, password, biometric, etc.) of the user, an identification (e.g., user name) of the user or the mobile device (e.g., cell number, serial number, etc.), a print job number, etc.

In STEP 210, one or more locations on a planned route of the user of the mobile device are obtained. The planned route may be included in the print job (STEP 205). Additionally or alternatively, the planned route may be received separately from the mobile device. If provided separately from the print job, the planned route may be accompanied with the authentication credential, identification of the mobile device, print job number, etc. in order to link the provided planned route with the previously received print job (STEP 205). Revised routes may be received from the mobile device at any time.

In one or more embodiments, the planned route is in the format of a schedule of the user's appointments and events. The schedule specifies the various destinations (e.g. venue names, addresses, etc.) and the times of the appointments and events. In such embodiments, the location may be a destination specified in the schedule. The location (i.e., destination) may be obtained by parsing the schedule. The coordinates (e.g., GPS coordinates) of the location may be obtained by querying external databases and/or websites.

In one or more embodiments, the planned route is in the format of a plotted route (e.g., driving directions). The plotted route may be generated by navigational software executing on the user mobile device. The locations may be buildings, addresses, landmarks, intersections, etc. that are passed or encountered during the plotted route. The locations may be labeled on the plotted route. The coordinates (e.g., GPS coordinates) of the locations may be obtained by querying external databases and/or websites. Additionally or alternatively, the plotted route may include the coordinates of the locations.

In STEP 215, a search is executed by the print service provider for printers both having the printer feature and located within a predetermined distance (e.g., 200 feet, 1 mile, 5 miles, etc.) of the locations obtained from the planned route. The predetermined distance may be specified by the user of the mobile device and included in the print job. There may be different distances for different locations. The search operation may include accessing a printer repository (e.g., printer repository (215)) storing the locations (e.g., GPS coordinates) of the printers and the printer features of each printer. Distances may be calculated between the locations and each printer having the printer feature(s) specified in the print job.

In STEP 225, a notification is sent from the print service provider to the mobile device over the network. The notification identifies the one or more printers that have the printer features and are within the predetermined distance(s) from the locations. Additionally or alternatively, the notification may include print fee for each of the identified one or more printers. The notification may be in any format including a GUI, a webpage with URL links, an email, a text message, a social network message, etc. The notification may be displayed on the mobile device that issued the print job. In one or more embodiments, the identified printers are presented on a display of the mobile device in such a manner where these printers are plotted on a plane coordinate of which X and Y axes respectively represent distance from a location and print fee. Parameters of the X and Y axes can be altered according to the user's preference. For instance, distance versus print completion time, print completion time versus print fee, and so on can be chosen by the user of the mobile device.

In STEP 230, a determination is made by the printer service provider whether a route deviation exists. In one or more embodiments, a route deviation exists if a revised schedule or a revised plotted route is received from the user mobile device. Additionally or alternatively, the process continues to track the current location of the mobile device and use the current location (e.g., current GPS coordinates) to determine whether a deviation exists. For example, if there is a mismatch (e.g., significant distance) between the destination and the mobile device's coordinates (e.g., GPS coordinates) at a time specified in the schedule when the user is expected to be at the destination, this may indicate the user has deviated from the planned route. As yet another example, if the current coordinates (e.g., GPS coordinates) of the of the user mobile device are not on (or not near) the plotted route, this may indicate that the user has deviated from the planned route. If a revised route has not been received, a revised route may be generated. For example, the revised route may be generated by adding the current location of the user to the schedule or plotted route. Additionally or alternatively, the revised route might consist solely of the current location of the user mobile device.

When it is determined that a deviation exists, the process returns to STEP 210, where one or more of the steps are repeated for the revised route. When it is determined that a deviation does not exist, the process proceeds to STEP 235.

In STEP 235, a confirmation is received from the mobile device. The confirmation is effectively a response to the notification. The confirmation may be a selection of one printer identified in the notification (if multiple printers are identified in the notification) and/or an approval to send the print job to the printer. The selection and approval are made by the user of the mobile device. The confirmation may be generated by manipulating a GUI widget, entering a number or code in a text message or email, a voice command, clicking a URL link, etc. Like the notification, the confirmation may take any format (e.g., email, fax, social network message, etc.).

In STEP 240, the print job is sent from the print service provider to the selected printer for generation of a hardcopy. As discussed above, the print job may include an authentication credential and the user of the mobile device may input the same/matching authentication credential into the printer in order to trigger printing.

Figure 3:
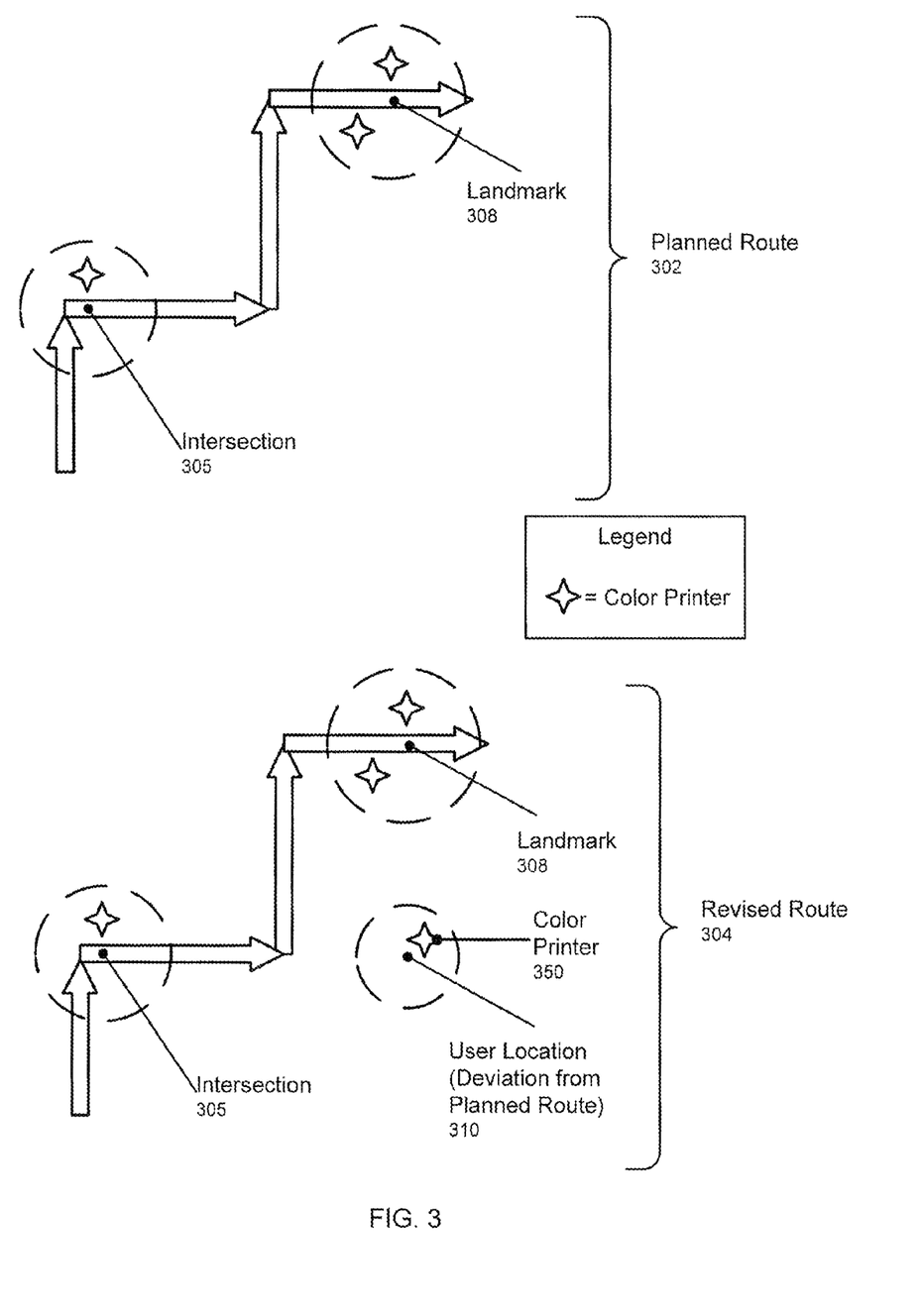
FIG. 3 shows an implementation example in accordance with one or more embodiments of the invention.

FIG. 3 shows an implementation example in accordance with one or more embodiments of the invention. As shown in FIG. 3, there exists a planned route (302) of a user. The planned route (302) is a plotted route (e.g., driving instructions) from a starting point to an ending point. The planned route is generated by navigation software executing on a smart phone of the user. Various locations (e.g., intersection (305), landmark (308)) are specified along the planned route (302).

The smart phone issues a print job specifying the planned route (302) of the user and specifying that color printing is a printer feature necessary to correctly generate a hardcopy for the print job. The print job is received by a print service provider. The print service provider obtains one or more locations (305, 308) from the planned route (302) and determines multiple color printers that are within a predetermined distance of the locations (305, 308). The print service provider issues a notification to the user mobile device identifying the multiple printers.

During this process, the user mobile device is being tracked by the print service provider. Specifically, the user mobile device is periodically uploading its GPS coordinates to the print service provider. The most recent GPS coordinate indicates the user's current location (310). As shown in FIG. 3, user location (310) is a considerable distance from the plotted route. The print service provider determines that the user has deviated from the planned route (302) because of this considerable distance. As the user has deviated from the planned route, the user is no longer passing by one or more of the locations (305, 308) and thus the printers near those locations (305, 308) are most likely no longer suitable to generate the hardcopy.

Still referring to FIG. 3, a revised route (304) is generated by the print service provider. The revised route (304) adds the user's location (310) to the originally planned route (302). The print service provider determines a color printer (350) within a predetermined distance of the user's current location (310). A new notification is sent to the user mobile device identifying the color printer (350). The user sends a confirmation for the color printer (350), and the print service provider sends the print job to the color printer (350) to generate a hardcopy. Had the deviation from the planned route (302) not occurred, the user would have selected one of the color printers near a location (305, 308) on the planned route (302). Moreover, the user would be in possession of the hardcopy document before reaching the end of the planned route (302).

One or more embodiments of the invention may have the following advantages: the ability to match printers to printer features specified in a print job; the ability to print on printers along a planned route of the user; the ability to track the user; the ability to detect a deviation from the planned route; the ability to revise the planned route and identify printers along the revised planned route; the ability to use a schedule of the user as a planned route; the ability to use a plotted route of navigation software as a planned route; the ability to select a printer to generate a hardcopy document when multiple printers are within a predetermined distance of locations on the planned route; the ability to issue notifications identifying multiple printers and issue confirmations selecting one of the printers on which to print; etc.

Figure 4:
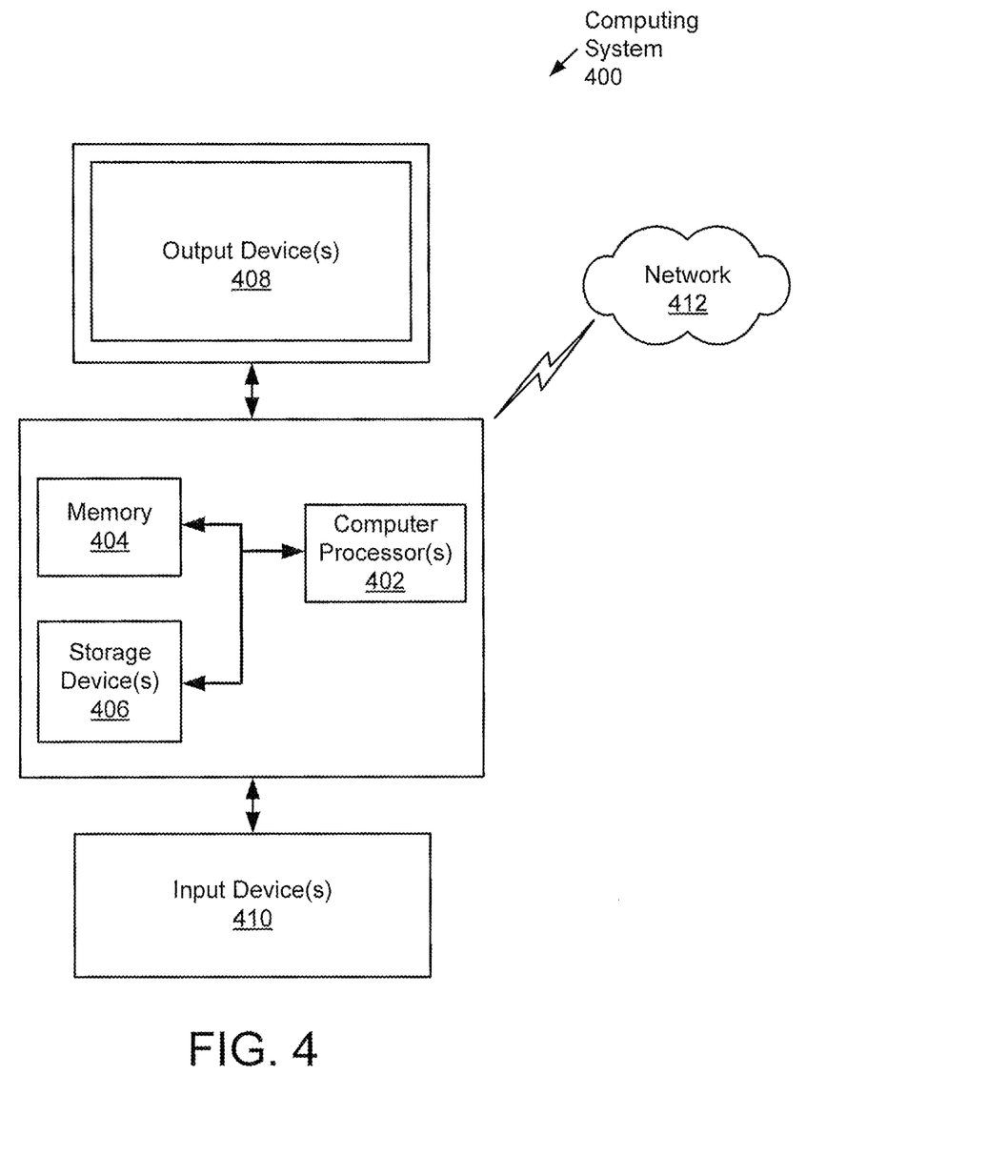
FIG. 4 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method performed by a print service provider (PSP) for printing, comprising:
   (a) obtaining from a network a print job issued by a mobile device and specifying a printer feature;

(b) obtaining a planned route of a user from the mobile device;

(c) obtaining a first location and a second location on the planned route of the user of the mobile device, wherein the planned route takes the user past a plurality of buildings and intersections;

(d) determining a first printer comprising the printer feature and located within a predetermined distance of the first location and a second printer comprising the printer feature and located within the predetermined distance of the second location;

(e) sending a notification identifying the first printer and the second printer to the mobile device;

(f) determining if a deviation from the planned route exists;

(g) if the deviation exists, repeating the steps (c) through (f) for a revised route; and (h) if the deviation does not exist:

receiving a confirmation for a printer selected from a group consisting of the first printer and the second printer, wherein the confirmation is a selection of the printer by the user of the mobile device; and sending the print job to the printer in response to the confirmation, wherein the printer generates a hardcopy document from the print job using the printer feature.

2. The method of claim 1, wherein obtaining the first location comprises:

parsing a schedule of the user, wherein the schedule comprises a plurality of appointments for the user and a plurality of times and a plurality of addresses for the plurality of appointments; and determining a destination of the user in the schedule, wherein the first location is the destination.

3. The method of claim 2, wherein determining that the deviation exists comprises:

identifying a mismatch between the destination and a geographical coordinate of the user at a time specified in the schedule, wherein the geographical coordinate is obtained from the mobile device.

4. The method of claim 2, wherein determining that the deviation exists comprises:

obtaining a revised schedule from the mobile device.

5. The method of claim 1, wherein the second location comprises at least one selected from a group consisting of a landmark passed on the planned route and an intersection encountered on the planned route.

6. The method of claim 1, wherein determining that the deviation exists comprises:

obtaining the revised route from the mobile device, wherein the planned route and the revised route are generated by navigational software executing on the mobile device.

7. The method of claim 1, wherein determining that the deviation exists comprises:

obtaining a current location of the user from the mobile device;

determining that the current location is not on the planned route.

8. The method of claim 1, wherein the print job further specifies an authentication credential, and wherein the user inputs the authentication credential at the printer before the printer generates the hardcopy document.

9. A non-transitory computer readable medium (CRM) storing computer readable program code embodied therein that causes a print service provider (PSP) to:

(a) obtain from a network a print job issued by a mobile device and specifying a printer feature;

(b) obtain a planned route of a user from the mobile device;

(c) obtain a first location and a second location on the planned route of the user of the mobile device, wherein the planned route takes the user past a plurality of buildings and intersections;

(d) determine a first printer comprising the printer feature and located within a predetermined distance of the first location and a second printer comprising the printer feature and located within the predetermined distance of the second location;

(e) send a notification identifying the first printer and the second printer to the mobile device;

(f) determine if a deviation from the planned route exists;

(g) if the deviation exists, repeating the steps (c) through (f) for a revised route; and (h) if the deviation does not exist:

receive a confirmation for a printer selected from a group consisting of the first printer and the second printer, wherein the confirmation is a selection of the printer by the user of the mobile device; and send the print job to the printer in response to the confirmation, wherein the printer generates a hardcopy document from the print job using the printer feature.

10. The non-transitory CRM of claim 9, wherein obtaining the first location comprises:

obtaining a schedule of the user, wherein the schedule comprises a plurality of appointments for the user and a plurality of times and a plurality of addresses for the plurality of appointments; and determining a destination of the user specified in the schedule, wherein the first location is the destination.

11. The non-transitory CRM of claim 10, wherein determining that the deviation exists comprises:

identifying a mismatch between the destination and a geographical coordinate of the user at a time specified in the schedule, wherein the geographical coordinate is obtained from the mobile device.

12. The non-transitory CRM of claim 9, wherein determining that the deviation exists comprises:

obtaining the revised route from the mobile device, wherein the planned route and the revised route are generated by navigational software executing on the mobile device.

13. A system for printing, comprising:

a memory; and a processor connected to the memory that:

(a) obtains a print job issued by a mobile device and specifying a printer feature, wherein the mobile device is operated by a user;

(b) obtains a planned route of the user from the mobile device;

(c) obtains a first location and a second location on the planned route of the user, wherein the planned route takes the user past a plurality of buildings and intersections;

(d) determines a first printer located within a predetermined distance of the first location and a second printer comprising the printer feature and located within the predetermined distance of the second location;

(e) sends a notification identifying the first printer and the second printer to the user mobile device;

(f) determines if a deviation from the planned route exists;

(g) if the deviation exists, repeating steps (c) through (f) for a revised route; and
(h) if the deviation does not exist:
receives, from the mobile device, a confirmation for a printer from the mobile device selected from a group consisting of the first printer and the second printer, wherein the confirmation is a selection of the printer by a user of the mobile device; and
sends the print job to the printer in response to the confirmation,
wherein the printer generates a hardcopy from the print job using the printer feature.

14. The system of claim 13, further comprising:
a printer repository that stores a plurality of coordinates of a plurality of printers and a plurality of features of the plurality of printers.

15. The system of claim 13, wherein the processor geographic routing engine obtains the first location by parsing a schedule of the user, wherein the schedule comprises a plurality of appointments for the user and a plurality of times and a plurality of addresses for the plurality of appointments, and wherein the first location is an address of an appointment.

16. The system of claim 15, wherein the processor determines the deviation exists by identifying a mismatch between the address of the appointment and a geographical coordinate of the user at a time specified in the schedule, wherein the geographical coordinate is obtained from the mobile device.

17. The system of claim 13, wherein the geographic routing engine determines the deviation exists by obtaining the revised route from the mobile device.

* * * * *